US007116768B2

(12) United States Patent
Smith et al.

(10) Patent No.: US 7,116,768 B2
(45) Date of Patent: Oct. 3, 2006

(54) COLLECT CALLBACK

(75) Inventors: Jeffrey B. Smith, Veradale, WA (US); Michael L. Eberle, Vista, CA (US)

(73) Assignee: dX/dY Voice Processing, Inc., Spokane, WA (US)

( * ) Notice: Subject to any disclaimer, the term of this patent is extended or adjusted under 35 U.S.C. 154(b) by 282 days.

(21) Appl. No.: 10/672,348

(22) Filed: Sep. 26, 2003

(65) Prior Publication Data

US 2005/0069111 A1    Mar. 31, 2005

(51) Int. Cl.
*H04M 15/00*    (2006.01)
*H04M 3/42*    (2006.01)

(52) U.S. Cl. ............................. 379/114.21; 379/127.05; 379/144.01; 379/143; 379/210.01

(58) Field of Classification Search ........... 379/114.01, 379/114.21, 114.22, 114.23, 114.24, 114.25, 379/127.03, 127.05, 127.08, 131, 143, 144.01, 379/144.02, 210.01; 705/53, 1
See application file for complete search history.

(56) References Cited

U.S. PATENT DOCUMENTS

| | | | |
|---|---|---|---|
| 4,054,756 A | 10/1977 | Comella et al. | |
| 4,908,852 A | 3/1990 | Hird et al. | |
| 4,930,152 A * | 5/1990 | Miller | 379/214.01 |
| 4,969,185 A | 11/1990 | Dorst et al. | |
| 5,003,584 A | 3/1991 | Benyacar et al. | |
| 5,146,491 A | 9/1992 | Silver et al. | |
| 5,184,345 A | 2/1993 | Sahni | |
| 5,483,581 A | 1/1996 | Hird et al. | |
| 5,596,634 A | 1/1997 | Fernandez et al. | |
| 5,740,229 A * | 4/1998 | Hanson et al. | 379/67.1 |
| 5,907,677 A * | 5/1999 | Glenn et al. | 709/206 |
| 6,035,027 A | 3/2000 | Alleman | |
| 6,111,940 A | 8/2000 | Kugell | |
| 6,141,405 A * | 10/2000 | Coulter | 379/188 |
| 6,195,418 B1 | 2/2001 | Ridgley | |
| 6,252,947 B1 | 6/2001 | Diamond et al. | |
| 6,339,640 B1 | 1/2002 | Chen et al. | |
| 6,363,411 B1 * | 3/2002 | Dugan et al. | 709/202 |
| 6,493,447 B1 | 12/2002 | Goss et al. | |
| 6,496,579 B1 | 12/2002 | Mashinsky | |
| 6,501,837 B1 | 12/2002 | Adler et al. | |
| 6,574,324 B1 * | 6/2003 | Malik | 379/210.01 |
| 6,775,365 B1 * | 8/2004 | Norby | 379/143 |
| 6,788,674 B1 * | 9/2004 | Karamchedu et al. | 370/352 |
| 6,865,161 B1 * | 3/2005 | Sponaugle et al. | 370/261 |
| 2001/0026609 A1 * | 10/2001 | Weinstein et al. | 379/93.01 |
| 2005/0163296 A1 * | 7/2005 | Smith et al. | 379/114.2 |
| 2005/0169456 A1 * | 8/2005 | Smith et al. | 379/265.09 |

OTHER PUBLICATIONS

Federal Register, 58 FR 42364, vol. 58, No. 151, Rules and Regulations, Federal Trade Commission, 16 CFR, Part 308, Trade Regulation Rule Pursuant to the Telephone Disclosure and Dispute Resolution Act of 1992, Part II, Aug. 9, 1993, 100 pages.
Federal Register, 58 FR 44769, vol. 58, No. 163, Rules and Regulations, Federal Communications Commission, 47 CFR, Part 64, Interstate Pay-per-call services, Aug. 25, 1993, 16 pages.

* cited by examiner

*Primary Examiner*—Quoc Tran
(74) *Attorney, Agent, or Firm*—Lee & Haynes, PLLC (57) ABSTRACT

In an implementation of collect callback, a call-in service establishes a communication link with a caller and initiates a collect callback option for the caller. A switch receives callback data from the call-in service and utilizes the callback data to establish a collect call via a second communication link between the caller and the call-in service.

71 Claims, 9 Drawing Sheets

COLLECT CALLBACK

TECHNICAL FIELD

This invention relates to collect callback.

BACKGROUND

Some telephone switching systems provide a callback feature that allows a caller to call the switching system, receive a hang-up response tone or some other indication from the system, and have the switching system call back so that the caller can dial a long distance number, yet maintain a cheaper rate through the switching system. Another caller-initiated callback system enables a caller to submit a callback request via the Internet, such as to a call center, and directly from an HTML page. The call center then completes the call to the number provided by the caller. These and other conventional caller-initiated callback systems are convenient and economical for business travelers and vacationers, for example, that travel overseas yet do not want to pay for the high costs, or tariffs, to place a call through a foreign telecommunications system.

SUMMARY

Collect callback is described herein.

In an implementation, a call-in service establishes a communication link with a caller and initiates a collect callback option for the caller. A switch receives callback data from the call-in service and utilizes the callback data to establish a collect call via a second communication link between the caller and the call-in service.

BRIEF DESCRIPTION OF THE DRAWINGS

The same numbers are used throughout the drawings to reference like features and components.

DETAILED DESCRIPTION

Collect callback is described in which a call-in service establishes a communication link with a caller, or call source, and initiates a collect callback option for the caller. In an event that a caller accepts the collect callback option, the call-in service communicates callback data to a switch that utilizes the callback data to authorize the collect call for the caller and to establish a collect call via a second communication link between the caller and the call-in service through the switch.

Collect callback may be implemented as part of a telecommunications system, a public switched telephone network, or as component(s) of any other communication and/or information services system. While aspects of the described systems and methods for collect callback can be implemented in any of these systems, collect callback is described in the context of the following exemplary environment.

Figure 1:
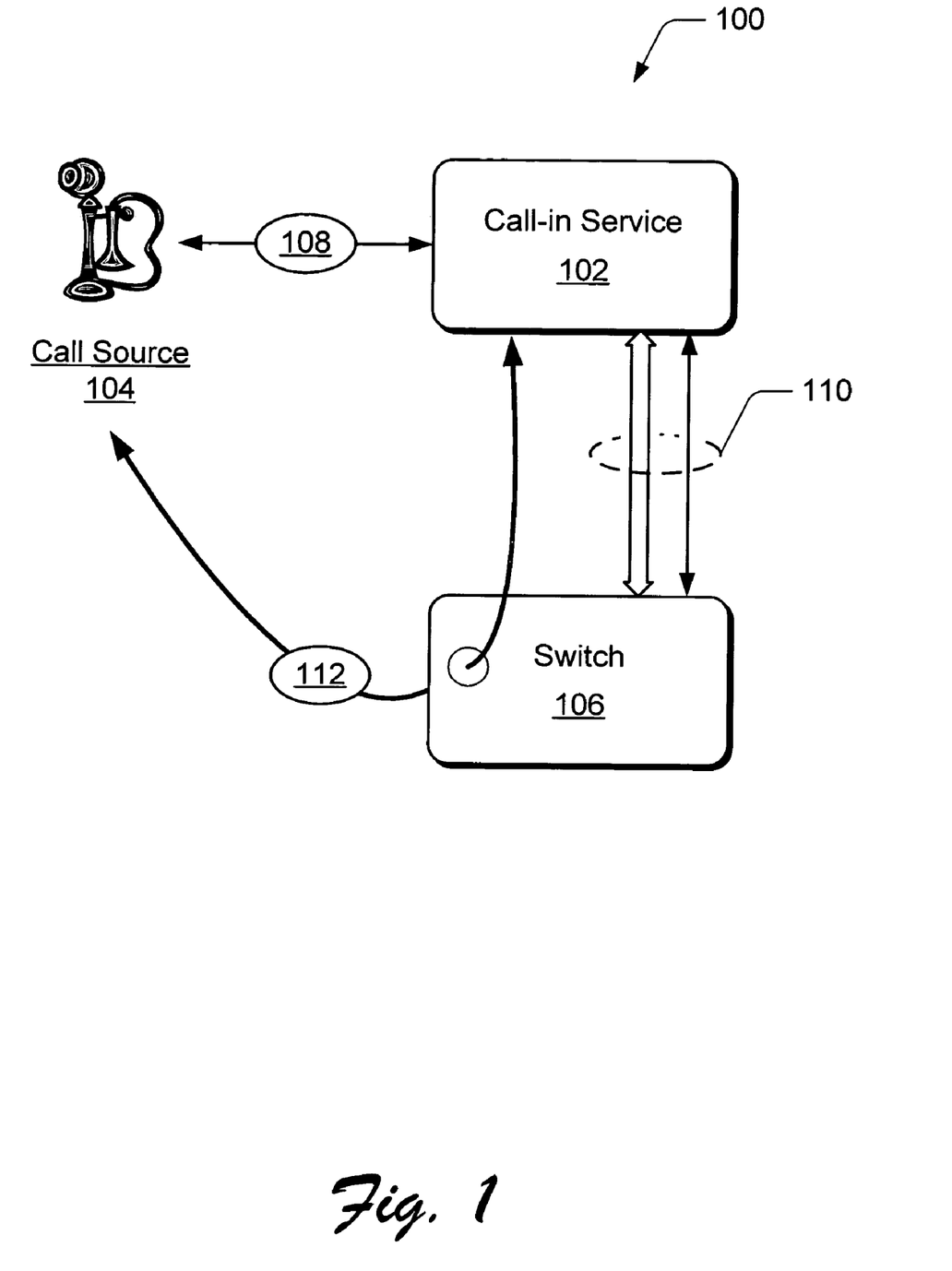
FIG. 1 illustrates an exemplary collect callback system.

FIG. 1 illustrates an exemplary collect callback system 100 that includes a call-in service 102, a call source 104, and a switch 106. The collect callback system 100 can be implemented in any form of telecommunications, communications, and/or services system. Call-in service 102 may be implemented as any number of different call-in and/or automated services that provide a service for a fee, such as an information service, technical support service, research database service, and the like. In one implementation a collect callback system can be implemented as an automated call-in dating service which is described with reference to FIG. 6.

In the example shown in FIG. 1, call source 104 may be a person (e.g., a caller), a communication device (e.g., a telephone, either wired or wireless), an automated device, any other type of electronic or computing device, and the like at a call origin, call station, call location, etc. When call source 104 initiates communication with call-in service 102, a communication link 108 is established such that the call-in service 102 and the call source 104 are communicatively coupled, or connected, either via a wired or wireless connection.

A caller 104 may be enticed to call into the service 102 for a duration during which the caller is not charged for the call (e.g., via communication link 108). The call-in service 102 may then offer the caller 104 a number of payment options to continue the call, such as charging the connection time to a credit card, calling a nine-hundred number to which a billing rate applies (e.g., typically on a per-minute basis), or the call-in service 102 can initiate a collect callback option for the caller 104.

In an event that a caller 104 selects the collect callback option by stating as such or by touchtone communication (e.g., the caller authorizes a collect call as a form of payment to continue the call or service), the call-in service 102 communicates callback data to the switch 106 via any type of communication link 110. The call-in service 102 and switch 106 may each include a communication interface by which the components are communicatively linked. The communication link(s) 110, and the other communication links described herein with reference to the several collect callback system implementations, can be any of a serial, parallel, network, wireless, or public switched telephone network interface that communicatively couples the components with each other and/or with other electronic or computing devices. Other examples of a communication link implementation can include digital, universal serial bus (USB), local area network (LAN), wide area network (WAN), metropolitan area network (MAN), any form of an Internet Protocol (IP) connection, and other similar types of information and communication connections.

The callback data communicated from call-in service 102 to switch 106 includes a call-in service identifier (e.g., any type of number and/or text designator) and a call source identifier (e.g., a ten-digit telephone number corresponding to the call source 104). When the communication link 108 is discontinued, the switch 106 utilizes the call source identifier to initiate and establish the collect call via a second communication link 112 between the call source 104 and the call-in service 102. In this example, the collect call communication link 112 is routed through the switch 106.

Figure 2:
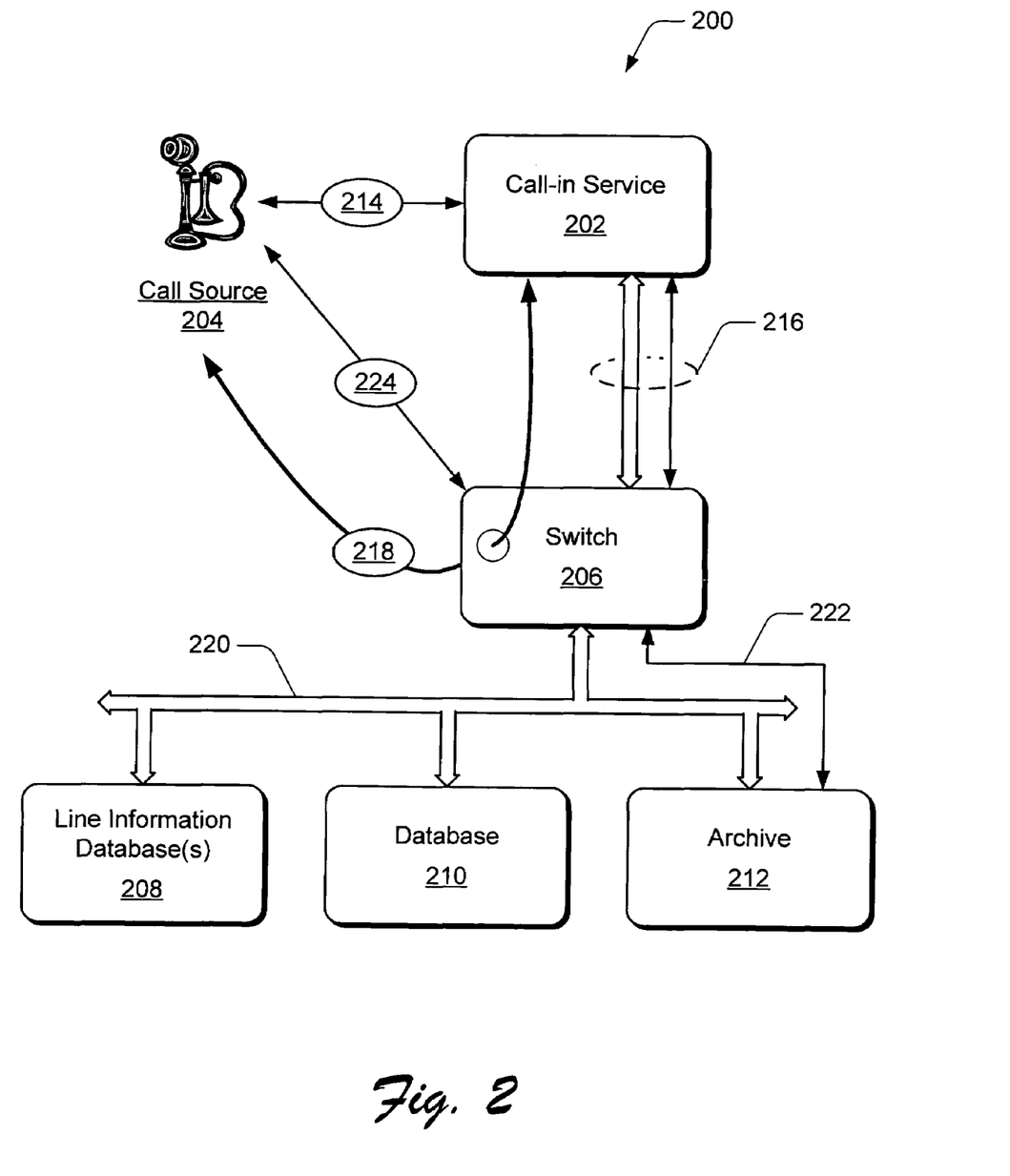
FIG. 2 illustrates another exemplary collect callback system.

FIG. 2 illustrates an exemplary collect callback system 200 that includes a call-in service 202, a call source 204, and a switch 206 each of which are described above with reference to FIG. 1. The collect callback system 200 may also be implemented in any form of telecommunications, communications, and/or services system. Collect callback system 200 also includes Line Information Database(s) 208, a database 210, and an archive 212.

In this example, the call-in service 202 establishes a communication link 214 with call source 204 in response to a call from the call source 204. The call-in service 202 initiates a collect callback option for the call source to continue the call after a time duration (e.g., units of minutes) during which the call source is not charged for the call. When call source 204 authorizes a collect call as a form of payment to continue the call or service, the call-in service 102 communicates callback data to switch 206 via any type of communication link 216.

Switch 206 can query the Line Information Database(s) 208 to verify that the call source can be billed for a collect call before establishing the collect call between the call-in service 202 and the call source 204. The Line Information Database is also commonly referred to as "LIDB" and contains caller information, such as a service profile, name and address, and telephone number validation information. The line information is typically accessed by other service providers to determine how to respond to a call. For example, a service provider (e.g., switch 206) can determine whether to allow call source 204 the collect call, or block the call.

The callback data communicated from call-in service 202 to switch 206 includes a call-in service identifier (e.g., any type of number and/or text designator) and a call source identifier (e.g., a ten-digit telephone number corresponding to the call source 204). The database 210 maintains a table or any other form of a data structure of relational data that includes call-in service identifiers and an associated access code for a particular call-in service 202. In an event that a collect callback system is implemented with one or more switches and multiple call-in services, a switch will obtain an access code for a particular call-in service so that the switch will re-establish a caller's communication link back to the same call-in service that initiated the collect callback option.

The switch 206 can obtain an access code that corresponds to a call-in service identifier received as callback data, and utilize the call source identifier and the access code to establish the collect call via a second communication link 218 between the call source 204 and the call-in service 202. The switch 206 can also obtain source data from database 210 that corresponds to the call source 204 to determine whether to authorize the collect call for the call source 204. For example, the call source data includes call limits for the call source which may be compared to call limit standards, also maintained by database 210. The call limits and call limit standards are described further with reference to FIG. 3. The switch 206 can be communicatively coupled to any of the Line Information Database 208, database 210, and/or archive 212 via any number of different communication links 220 and 222 (e.g., as described with reference to FIG. 1.)

The archive 212 maintains recorded data associated with the collect call. For example, the recorded data can include a recorded name of the call source (e.g., a caller's name) and a recording of the collect call, or a portion of the collect call. Before establishing the collect call communication link 218, the switch 206 can communicate an instruction (e.g., via communication link 224) to the call source 204 to verbalize a name to generate the recorded name of the call source.

After verifying and authorizing the collect call, switch 206 can notify the call-in service 202 via communication link(s) 216 that the collect call for the call source 204 is authorized. Call-in service 202 can then discontinue the communication link 214 with the call source 204 such that switch 206 can establish the collect call via the second communication link 218 between call source 204 and the call-in service 202 through switch 206. After establishing the collect call communication link 218, the switch 206 can transfer communications, or portions thereof, of the collect call to the archive 212 to generate the recording of the collect call.

Although database 210 and archive 212 are each illustrated and described as single database implementations, each of the databases 210 and 212 can be implemented as several memory components distributed to each maintain data and information pertaining to collect callback in a collect callback system (e.g., collect callback systems 100 and 200). Further, although database 210 and archive 212 are illustrated and described as separate databases, the database 210 and the archive 212 can be implemented together as a single database. Additionally, the database 210 and archive 212 can each be implemented as a memory component of the switch 206. Although not shown in this example, a component of a collect callback system (e.g., collect callback systems 100 and 200), such as switch 206, may be implemented with any number and combination of differing components as further described below with reference to the exemplary computing device shown in FIG. 9.

Figure 3:
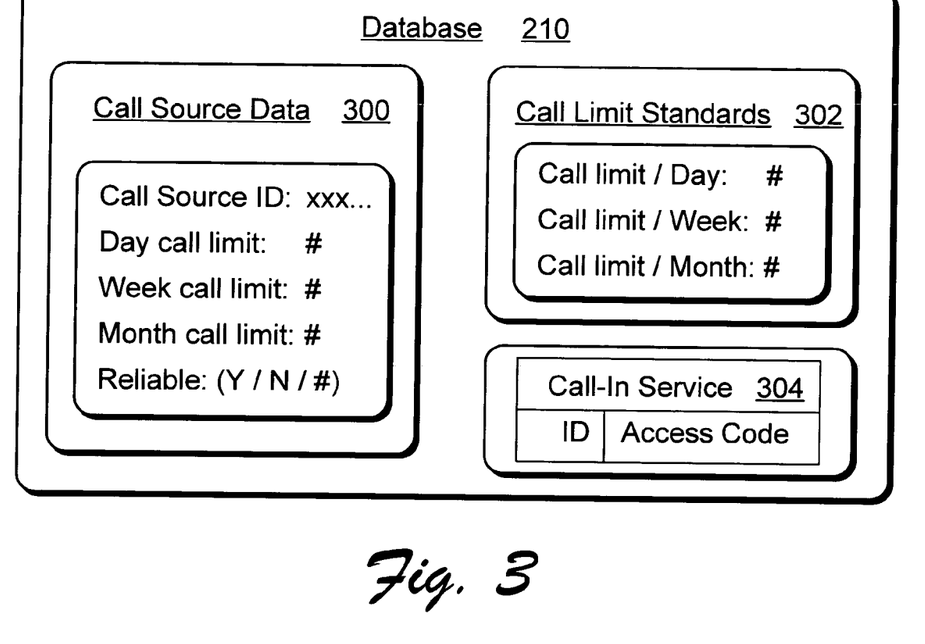
FIG. 3 illustrates examples of data associated with collect callback and maintained with a database as shown in FIG. 2.

FIG. 3 illustrates examples of data associated with collect callback and maintained with a database 210 as shown in FIG. 2. Call source data 300 corresponds to a call source (e.g., call sources 104 and 204) and can include a call source identifier, a day call limit, a week call limit, month call limit, and an indication of whether the call source is reliable in paying for collect call charges in a timely manner. Any and/or all of the call source data 300 can be obtained by a switch 206 to determine whether to authorize a collect call for a particular call source 204.

The database 210 also maintains call limit standards 302 and a table 304 (e.g., any form of a data structure) of relational data that includes a call-in service identifier and an associated access code for a particular call-in service 202. The call limit standards 302 can be based on established thresholds as determined by uncollected revenue and based on the averages of all callers that do not pay for telephone charges, such as long distance charges, collect call charges, etc. One example of call limit standards 302 can be two calls per day that are only twenty minutes each, eighty minutes per week, and one-hundred twenty minutes per month.

The call limits in the call source data 300 for a particular call source 204 can be based on these call limit standards, or can be adjusted on a caller by caller basis. For example, the indication of whether a call source is reliable (e.g., yes, no, and/or some number or text indicator to rate a call source) can be utilized to increase or decrease a particular call source day, week, and month call limits. Optionally, a call source can be blocked from making any calls through the switch due to a poor payment history.

Figure 4:
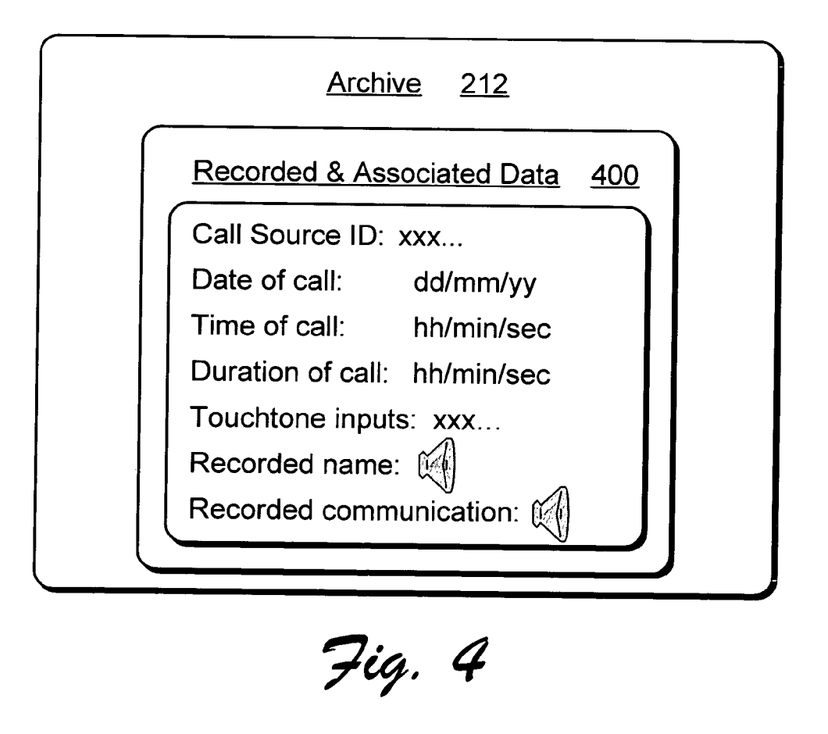
FIG. 4 illustrates examples of recorded and associated data maintained with an archive as shown in FIG. 2.

FIG. 4 illustrates an example of recorded and associated data 400 that is maintained in archive 212 and which corresponds to a collect call. The recorded and associated data 400 includes any one or combination of a call source identifier associated with the collect call, a date of the collect call, a time of the collect call, a duration of the collect call, any caller touchtone inputs, a recorded name of a caller, and a recording of the collect call, or a portion thereof.

The switch 206 can obtain any of this archived and recorded information corresponding to a particular collect call when a caller disputes the charges for the collect call. For example, when a caller calls into a telephone billing company to dispute the charges for a collect call, the caller can be communicatively linked to the recorded and associated data 400 where they will hear themselves identified (e.g., recorded name) and at least a portion of the collect call (e.g., recorded communication). Although database 210 is shown with only one example of call source data 300 for only one call source 204, and archive 212 is shown with only one example of recorded and associated data 400 for a single collect call, each can maintain any number of call source data and recorded data, respectively, that corresponds to any number of call sources and associated collect calls.

Figure 5:
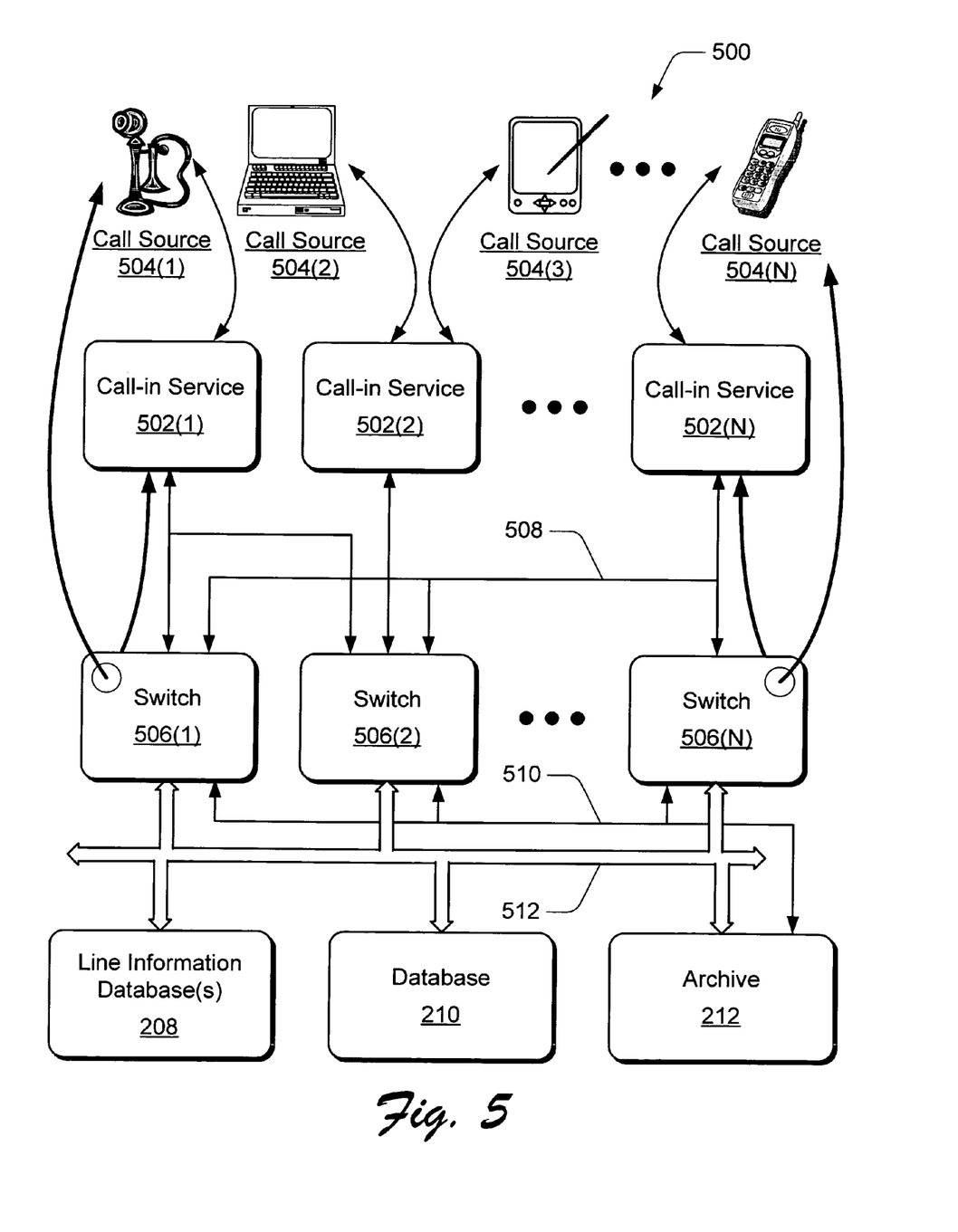
FIG. 5 illustrates an exemplary collect callback system having any number of various components.

FIG. 5 illustrates an exemplary collect callback system 500 having any number of various components such as multiple call-in services 502(1), 502(2), . . . , 502(N), multiple call sources 504(1), 504(2), . . . , 504(N), and multiple switch components 506(1), 506(2), . . . , 506(N). A call source can be any wired or wireless communication device such as a phone 504(1), a portable computer 504(2), a PDA 504(3), a cell phone 504(N), and/or any other electronic or computing device.

Any number of call sources 504 can be communicatively linked to a call-in service 502 at any one time. For example, call source 504(2) and 504(3) are each in communication with call-in service 502(2). Further, any number of call-in services 502 can be communicatively linked to a switch component 506 at any one time via communication links 508. For example, call-in services 502(1), 502(2), and 502(N) are all in communication with switch 506(2). Additionally, each switch 506 can access the Line Information Database(s) 208, the database 210, and the archive 212 via communication links 510 and 512.

Figure 6:
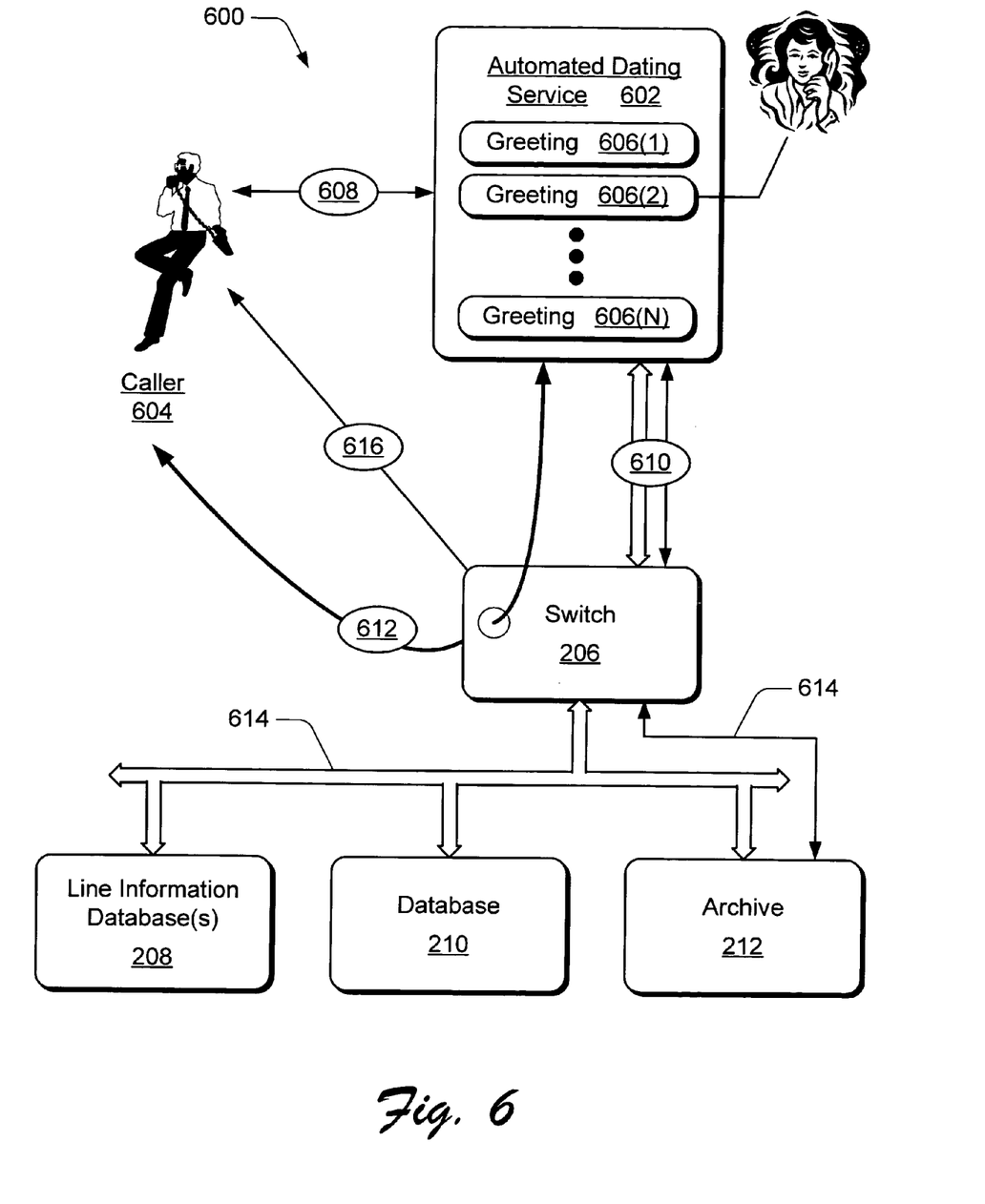
FIG. 6 illustrates an exemplary implementation of a collect callback system.

FIG. 6 illustrates an exemplary implementation of a collect callback system 600 which includes an automated dating service 602, a caller 604, and switch 206. Collect callback system 600 also includes Line Information Database(s) 208, the database 210, and the archive 212. The automated dating service 602 includes multiple recorded greetings 606(1), 606(2), . . . , 606(N) that a caller 604 can access and listen to via communication link 608. In this exemplary implementation, women may call into the dating service 602 free of charge and record a greeting 606. Men are enticed to call into the dating service 602 for a duration of time during which the caller 604 is not charged for the call. The caller 604 can listen to the greetings 606 and select any of them to leave a return message for the person that recorded the message. Further, if a caller 604 selects a greeting that has been recorded by someone that is also connected into the service 602, the service can connect the caller and the other person, such as caller 604 and the woman that recorded greeting 606(2).

When the caller's free time has been expended, the dating service 602 offers the caller 604 a number of payment options to continue the call, such as charging the connection time to a credit card, calling a nine-hundred number to which a billing rate applies (e.g., typically on a per-minute basis), or the dating service 602 initiates a collect callback option for the caller 604.

In an event that a caller 604 selects the collect callback option by stating as such or by touchtone communication (e.g., the caller authorizes a collect call as a form of payment to continue the call or service), the dating service 602 communicates callback data to the switch 206 via any type of communication link 610. Switch 206 can query the Line Information Database(s) 208 to verify that the caller 604 can be billed for a collect call before establishing the collect call between the dating service 602 and the caller 604. The callback data received from the dating service 602 includes a dating service identifier (e.g., call-in service identifier and access code 304 shown in FIG. 3) and a call source identifier (e.g., a ten-digit telephone number corresponding to the caller 604).

The switch 206 can obtain an access code that corresponds to the dating service identifier and utilize the call source identifier and the access code to establish the collect call via a second communication link 612 between the caller 604 and the dating service 602. The switch 206 can also obtain caller data (e.g., call source data 300 shown in FIG. 3) via any type of communication link 614 from database 210 that corresponds to the caller 604 to determine whether to authorize the collect call for the caller. The switch can also communicate an instruction (e.g., via communication link 616) to the caller 604 to verbalize his name which is used to generate a recorded name that can be maintained in the archive 212 as recorded data (e.g., recorded and associated data 400 shown in FIG. 4).

After verifying and authorizing the collect call, switch 206 can notify the dating service 602 via communication link(s) 610 that the collect call for the caller 604 is authorized. The dating service 602 can then discontinue the communication link 608 with the caller 604 so that switch 206 can establish the collect call via the second communication link 612 between caller 604 and the dating service 602 through switch 206. After establishing the collect call communication link 612, the switch 206 can transfer communications, or portions thereof, of the collect call to the archive 212 to generate a recording of the collect call. In an example, the first sixty seconds of the collect call are recorded and/or only the caller 604 is recorded.

Figure 7:
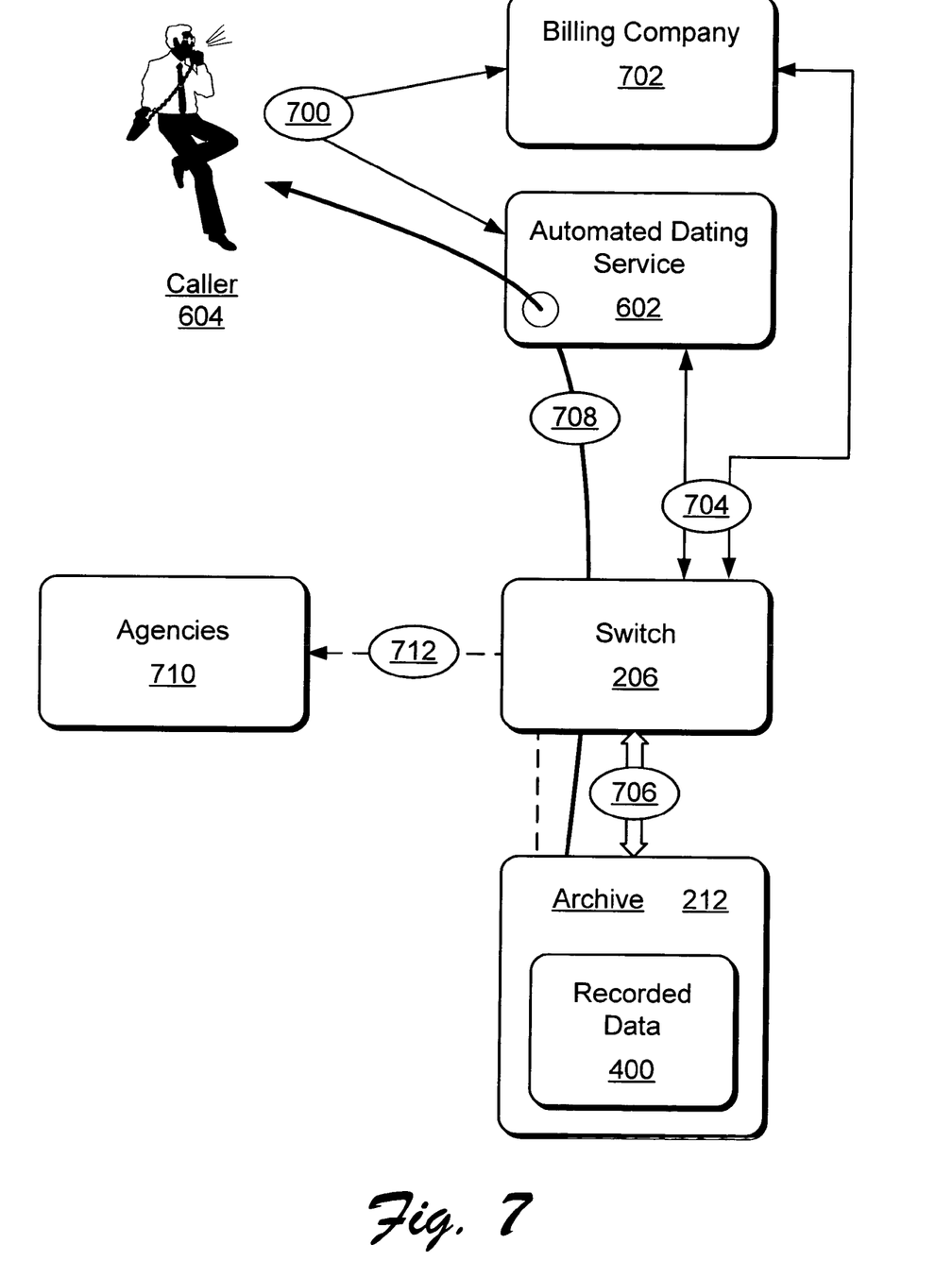
FIG. 7 further illustrates the exemplary implementation of the collect callback system shown in FIG. 6.

FIG. 7 further illustrates the exemplary implementation of the collect callback system 600 shown in FIG. 6. In this example, caller 604 receives a bill for the collect call to the dating service 602 and calls 700 the billing entity to dispute the charges for the collect call. The billing entity may be the switch 206, the dating service 602, or a different billing company 702. The caller can enter an identifier, or combination of identifiers, for the collect call to identify the disputed call to the billing entity. For example, the caller may enter a tracking number or a combination of the date and time of the collect call.

The billing entity then accesses the archive 212 via communication links 704 and 706 through the switch 206 (e.g., or the switch 206 accesses the archive 212 directly if the switch is the billing entity). The switch establishes a playback communication link 708 to the caller 604 and from the recorded data 400 that corresponds to the disputed collect call. The caller 604 will hear his own identification (e.g., recorded name) and a portion of the collect call (e.g., recorded communication). The playback communication link 708 can be routed through the billing entity, such as through dating service 602 as shown in FIG. 7. The caller's own identification and recorded portion of the collect call is more than sufficient to sustain the charges against the caller 604.

In an alternate implementation, the switch 206 can obtain the recorded data 400 from archive 212 and submit the recorded data to other agencies (or agency) 710 via a communication link 712 through the switch 206. The recorded data can be submitted as an attached audio file to an email, for example. This may be useful for police investigations, legal challenges, and for any other similar situation in which it is desirable to evidence that a particular caller was a party to a communication on a particular date for a recorded duration of time and/or that the caller authorized payment for a call.

Methods for collect callback may be described in the general context of computer-executable instructions. Generally, computer-executable instructions include routines, programs, objects, components, data structures, and the like that perform particular functions or implement particular abstract data types. Methods for collect callback may also be practiced in distributed computing environments where functions are performed by remote processing devices that are linked through a communications network. In a distributed computing environment, computer-executable instructions may be located in both local and remote computer storage media, including memory storage devices.

Figure 8A:
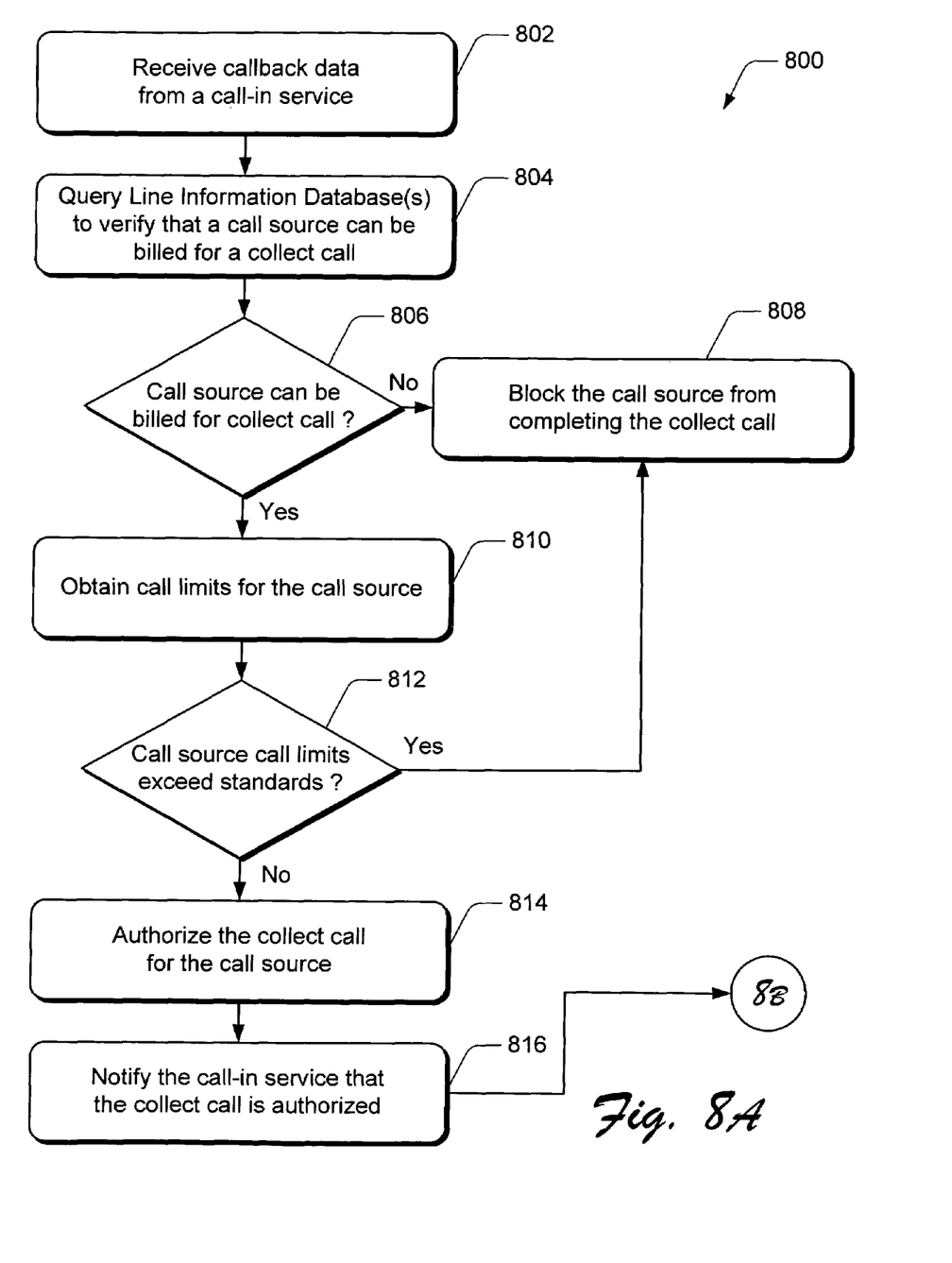
FIGS. 8A and 8B illustrate a flow diagram of an exemplary method for collect callback.
Figure 8B:
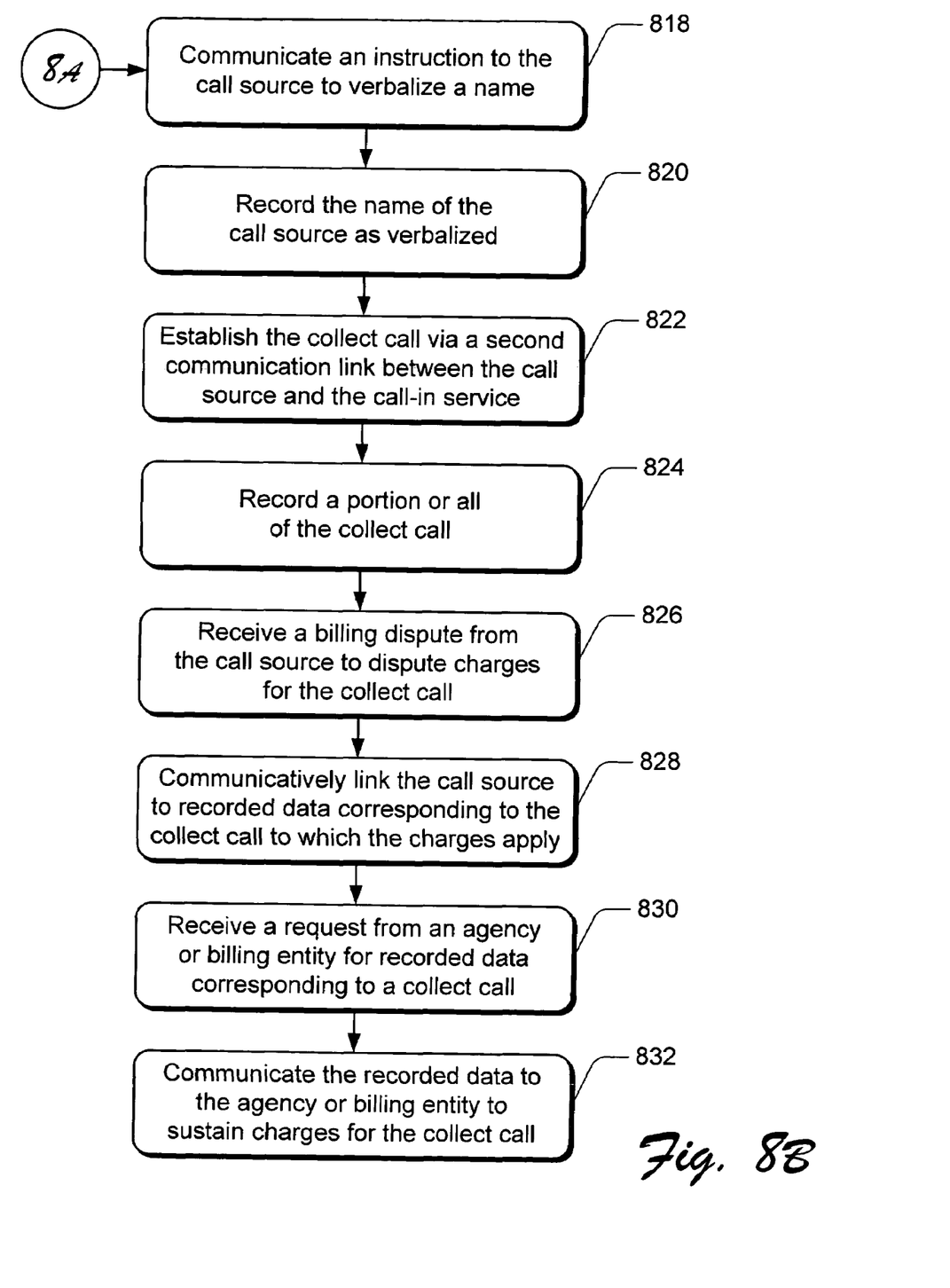

FIGS. 8A and 8B illustrate a method 800 for collect callback. The order in which the method is described is not intended to be construed as a limitation, and any number of the described method blocks can be combined in any order to implement the method. Furthermore, the method can be implemented in any suitable hardware, software, firmware, or combination thereof.

At block 802 (FIG. 8A), callback data is received from a call-in service. The call-in service receives a collect callback selection from a call source to which the call-in service has initiated a collect callback option via a communication link. For example, call-in service 202 (FIG. 2) has a communication link 214 with call source 204 and call-in service 202 initiates a collect callback option for the call source 204. The call source 204 authorizes, or otherwise selects the collect callback option and the call-in service 202 communicates callback data to switch 206. Receiving the callback data includes receiving a call source identifier and a call-in service identifier that corresponds to an associated access code for the call-in service 202.

At block 804, a Line Information Database is queried to verify that a call source can be billed for a collect call and at block 806, a determination is made as to whether the call source can be billed for the collect call. If the call source cannot be billed for the collect call (i.e., "no" from block 806), then the call source is blocked from completing the collect call at block 808. If the call source can be billed for the collect call (i.e., "yes" from block 806), then call limits for the call source are obtained at block 810. For example, switch 206 (FIG. 2) obtains call limits from the call source data 300 (FIG. 3) maintained with database 210.

At block 812, a determination is made as to whether the call limits for the call source exceed call limit standards. For example, switch 206 compares the call limits 300 for the call source to call limit standards 302 also maintained with database 210. The call limit standards 302 include at least one of a day limit, a week limit, and a month limit for calls by a particular call source. If the call limits for the call source do exceed call limit standards (i.e., "yes" from block 812), then the call source is again blocked from completing the collect call at block 808. If the call limits for the call source do not exceed call limit standards (i.e., "no" from block 812), then the collect call is authorized for the call source at block 814.

At block 816, the call-in service is notified that the collect call for the call source is authorized. The call-in service can discontinue the communication link with the call source to enable establishing the collect call via the second communication link. For example, the switch 206 notifies the call-in service 202 that the collect call for the call source 204 is authorized and the call-in service 202 discontinues the communication link 214 with the call source 204.

At block 818 (FIG. 8B), an instruction is communicated to the call source to verbalize a name. For example, switch 206 communicates an instruction via communication link 224 to the call source 204 to verbalize a name (to be recorded). At block 820, the name of the call source is recorded as verbalized. For example, the recorded name of the caller is maintained with the recorded and associated data 400 in archive 212 (FIG. 4).

At block 822, the collect call is established via a second communication link between the call source and the call-in service. For example, the switch 206 establishes the collect call via communication link 218 between call source 204 and call-in service 202 through the switch 206. At block 824, a portion (or all) of the collect call is recorded. For example, a recorded communication of the collect call is maintained with the recorded and associated data 400 in archive 212 (FIG. 4). The recorded and associated data 400 maintained with archive 212 also includes at least one of a call source identifier, a date of the collect call, a time of the collect call, a duration of the collect call, and call source touchtone inputs.

At block 826, a billing dispute is received from the call source to dispute charges for the collect call to the call-in service. For example, a caller 604 (FIG. 7) calls a billing entity (e.g., switch 206, automated dating service 602, or billing company 702) to dispute the charges for a collect call to an automated service 602. At block 828, the call source is communicatively linked to an archive of recorded data corresponding to the collect call to which the charges apply. For example, switch 206 establishes a communication link 708 (FIG. 7) between the archive 212 and caller 604 such that the caller can listen to the recorded data 400 which includes the caller's recorded name and a recording of a portion of the collect call.

At block 830, a request is received from an agency or billing entity for recorded data corresponding to the collect call. The recorded data can include the recorded name of the call source and the recording of the portion of the collect call. For example, an agency 710 (FIG. 7) can request the recorded data 400 from switch 206. At block 832, the recorded data is communicated to the agency or billing entity such that the agency or billing entity can utilize the recorded data to sustain charges for a collect call. For example, switch 206 communicates the recorded data 400 to an agency 710 via communication link 712.

Figure 9:
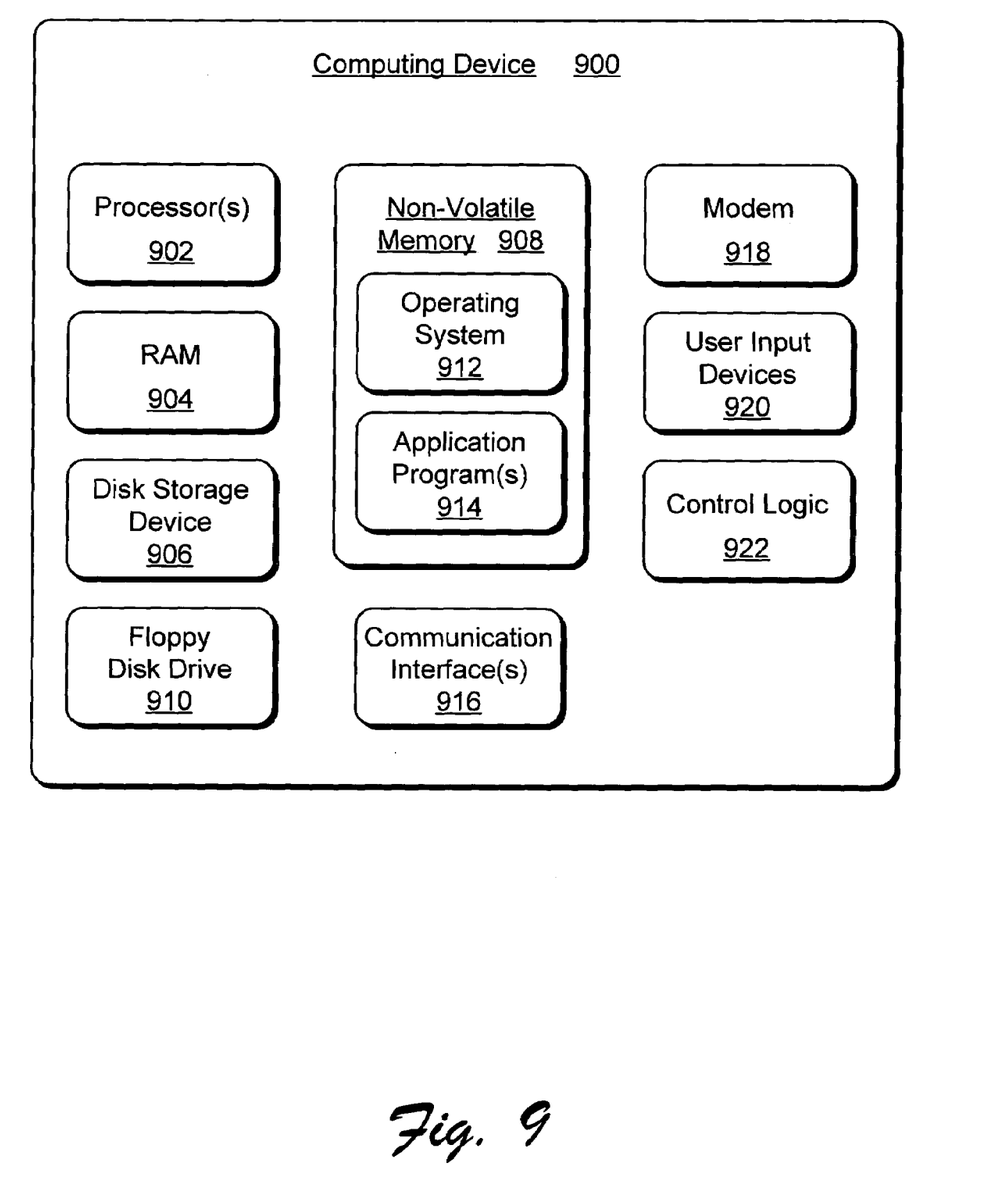
FIG. 9 illustrates various components of an exemplary computing device that may be implemented as various components of a collect callback system.

FIG. 9 illustrates an exemplary computing device 900 that may be implemented as various components of a collect callback system, such as a switch (e.g., switch 106, switch 206, database 210, archive 212, and the like). Computing device 900 includes one or more processors 902 (e.g., any of microprocessors, controllers, and the like) which process various instructions to control the operation of computing device 900 and to communicate with other electronic and computing devices. Computing device 900 can be implemented with one or more memory components, examples of which include a random access memory (RAM) 904, a disk storage device 906, non-volatile memory 908 (e.g., any one or more of a read-only memory (ROM), flash memory, EPROM, EEPROM, etc.), and a floppy disk drive 910.

Disk storage device 906 can include any type of magnetic or optical storage device, such as a hard disk drive, a magnetic tape, a recordable and/or rewriteable compact disc (CD), a DVD, DVD+RW, and the like. The one or more memory components provide data storage mechanisms to store various information and/or data such as configuration information for computing device 900, and any other types of information and data related to operational aspects of computing device 900. Alternative implementations of computing device 900 can include a range of processing and memory capabilities, and may include any number of differing memory components than those illustrated in FIG. 9.

An operating system 912 and one or more application program(s) 914 can be stored in non-volatile memory 908 and executed on processor(s) 902 to provide a runtime environment for computing device 900. Computing device 900 further includes one or more communication interfaces 916 and a modem 918. The communication interfaces 916 can be implemented as any one or more of a serial and/or parallel interface, as a wireless interface, any type of network interface, and as any other type of communication interface. A wireless interface enables computing device 900 to receive control input commands and other information from an input device, such as from a remote control device or from another infrared (IR), 802.11, Bluetooth, or similar RF input device.

A network interface provides a connection between computing device 900 and a data communication network which allows other electronic and computing devices coupled to a common data communication network to communicate information to computing device 900 via the network. Similarly, a serial and/or parallel interface provides a data communication path directly between computing device 900 and another electronic or computing device. Modem 918 facilitates computing device 900 communication with other electronic and computing devices via a conventional telephone line, a DSL connection, cable, and/or other type of connection.

Computing device 900 may include user input devices 920 that can include a keyboard, mouse, pointing device, and/or other mechanisms to interact with, and to input information to computing device 900. Computing device 900 also may include control logic 922. As used herein, the term "logic" refers to hardware, firmware, software, or any combination thereof that may be implemented to perform the logical operations associated with a particular function or with the operability of computing device 900, a switch (e.g., switch 206), or database (e.g., database 210 and archive 212). Logic may also include any supporting circuitry that is utilized to complete a given task including supportive non-logical operations. For example, logic may also include analog circuitry, memory components, input/output (I/O) circuitry, interface circuitry, power providing/regulating circuitry, microstrip transmission lines, and the like.

Although shown separately, some of the components of computing device 900 may be implemented in an application specific integrated circuit (ASIC). Additionally, a system bus (not shown) typically connects the various components within computing device 900. A system bus can be implemented as one or more of any of several types of bus structures, including a memory bus or memory controller, a peripheral bus, an accelerated graphics port, or a local bus using any of a variety of bus archetectures.

Although collect callback has been described in language specific to structural features and/or methods, it is to be understood that the subject of the appended claims is not necessarily limited to the specific features or methods described. Rather, the specified features and methods are disclosed as exemplary implementations of collect callback.

The invention claimed is:

1. A collect callback system, comprising:
   a call-in service configured to establish a communication link with a call source, the call-in service further configured to initiate a collect callback option for the call source that can authorize receiving a collect call initiated by the call-in service; and
   a switch configured to receive callback data from the call-in service, the switch further configured to establish the collect call via a second communication link that is completed between the call source and the call-in service to enable the collect call.

2. A collect callback system as recited in claim 1, wherein the switch is further configured to route the collect call via the second communication link through the switch.

3. A collect callback system as recited in claim 1, wherein the switch is further configured to notify the call-in service that the collect call for the call source is authorized such that the call-in service can discontinue the communication link with the call source and such that the switch can establish the collect call via the second communication link.

4. A collect callback system as recited in claim 1, wherein the switch is further configured to query a Line Information Database to verify that the call source can be billed for the collect call.

5. A collect callback system as recited in claim 1, further comprising a database configured to maintain a call-in service identifier and an associated access code that each correspond to the call-in service, and wherein the switch is further configured to:
   receive the callback data which includes the call-in service identifier and a call source identifier;
   obtain the access code associated with the call-in service identifier from the database; and
   utilize the call source identifier and the access code to establish the collect call via the second communication link between the call source and the call-in service.

6. A collect callback system as recited in claim 1, further comprising a database configured to maintain call source data that corresponds to the call source, and wherein the switch is further configured to obtain the call source data from the database and utilize the call source data to authorize the collect call for the call source.

7. A collect callback system as recited in claim 1, further comprising a database configured to:
   maintain call source data that corresponds to the call source, the call source data including call limits for the call source;
   maintain call limit standards that identify at least one of a day limit, a week limit, or a month limit; and
   wherein the switch is further configured to obtain the call source data from the database and authorize the collect call for the call source if the call limits for the call source do not exceed the call limit standards.

8. A collect callback system as recited in claim 1, further comprising a database configured to maintain an archive of recorded data associated with the collect call between the call source and the call-in service, the recorded data including a recorded name of the call source and a recording of the collect call;

wherein the switch is further configured to:
communicate an instruction to the call source to verbalize a name to generate the recorded name of the call source; and
transfer at least a portion of the collect call to the database to generate the recording of the collect call.

9. A collect callback system as recited in claim 1, further comprising a database configured to maintain an archive of recorded data associated with the collect call between the call source and the call-in service, the recorded data including at least one of a call source identifier, a date of the collect call, a time of the collect call, a duration of the collect call, call source touchtone inputs, a recorded name of the call source, and a recording of the collect call;
wherein the switch is further configured to:
communicate an instruction to the call source to verbalize a name to generate the recorded name of the call source; and
transfer at least a portion of the collect call to the database to generate the recording of the collect call.

10. A collect callback system as recited in claim 1, further comprising a database configured to:
maintain call source data that corresponds to the call source, the call source data including call limits for the call source;
maintain call limit standards that identify at least one of a day limit, a week limit, or a month limit; maintain an archive of recorded data associated with the collect call between the call source and the call-in service, the recorded data including a recorded name of the call source and a recording of the collect call; wherein the switch is further configured to:
query a Line Information Database to verify that the call source can be billed for the collect call;
obtain the call source data from the database and authorize the collect call for the call source if the call limits for the call source do not exceed the call limit standards;
communicate an instruction to the call source to verbalize a name to generate the recorded name of the call source; and
transfer at least a portion of the collect call to the database to generate the recording of the collect call.

11. A telecommunications system comprising a collect callback system that includes:
a call-in service configured to establish a communication link with a call source, the call-in service further configured to initiate a collect callback option for the call source that can authorize receiving a collect call initiated by the call-in service; and
a switch configured to receive callback data from the call-in service, the switch further configured to establish the collect call via a second communication link between the call source and the call-in service, the collect call being completed from the call-in service to the call source to enable the collect call.

12. A collect callback system, comprising:
a switch configured to receive callback data from a call-in service that has initiated a collect callback option for a call source with which the call-in service has an established communication link;
a database configured to maintain an archive of recorded data associated with a collect call between the call source and the call-in service, the recorded data including a recorded name of the call source and a recording of the collect call;
the switch further configured to:
communicate an instruction to the call source to verbalize a name to generate the recorded name of the call source;
establish the collect call via a second communication link between the call source and the call-in service, the collect call being completed from the call-in service to the call source to enable the collect call; and
transfer at least a portion of the collect call to the database to generate the recording of the collect call.

13. A collect callback system as recited in claim 12, wherein the switch is further configured to route the collect call via the second communication link through the switch.

14. A collect callback system as recited in claim 12, wherein the database is further configured to maintain associated recorded data that includes at least one of a call source identifier, a date of the collect call, a time of the collect call, a duration of the collect call, and call source touchtone inputs.

15. A collect callback system as recited in claim 12, wherein the switch is farther configured to notify the call-in service that the collect call for the call source is authorized such that the call-in service can discontinue the established communication link with the call source and such that the switch can establish the collect call via the second communication link.

16. A collect callback system as recited in claim 12, wherein the switch is farther configured to query a Line Information Database to verify that the call source can be billed for the collect call.

17. A collect callback system as recited in claim 12, wherein the database is further configured to maintain call source data that corresponds to the call source, and wherein the switch is further configured to obtain the call source data from the database and authorize the collect call for the call source.

18. A collect callback system as recited in claim 12, wherein the database is further configured to maintain a call-in service identifier and an associated access code that each correspond to the call-in service, and wherein the switch is further configured to:
receive the callback data which includes the call-in service identifier and a call source identifier;
obtain the access code associated with the call-in service identifier from the database; and
utilize the call source identifier and the access code to establish the collect call via the second communication link between the call source and the call-in service.

19. A collect callback system as recited in claim 12, wherein the database is further configured to:
maintain call source data that corresponds to the call source, the call source data including call limits for the call source;
maintain call limit standards that identify at least one of a day limit, a week limit, or a month limit; and
wherein the switch is further configured to obtain the call source data from the database and authorize the collect call for the call source if the call limits for the call source do not exceed the call limit standards.

20. A telecommunications system comprising the collect callback system as recited in claim 12.

21. A collect callback system comprising a switch configured to:
receive a call-in service identifier and a call source identifier from a call-in fee-based service that has initiated a collect callback option for a call source with which the call-in fee-based service has an established communication link;
utilize the call source identifier to initiate a collect call for the call source which authorizes receiving the collect call from the call-in service;
communicate an instruction to the call source to verbalize a name to generate a recorded name of the call source;
utilize the call-in service identifier to establish the collect call via a second communication link between the call source and the call-in fee-based service where the collect call is completed from the call-in fee-based service to the call source to enable the collect call; and
generate a recording of at least a portion of the collect call.

22. A collect callback system as recited in claim 21, wherein the switch is further configured to query a Line Information Database to verify that the call source can be billed for the collect call.

23. A collect callback system as recited in claim 21, wherein the call-in fee-based service is a call-in dating service.

24. A collect callback system, comprising: an automated service configured to (1) establish a communication link with a caller, (2) initiate a collect callback option for the caller as a form of payment for a duration of a collect call to be initiated by the automated service, and (3) receive an authorization input for the collect call from the caller;
a database configured to maintain an archive of recorded data associated with the collect call, the recorded data including a recorded name of the caller and a recording of at least a portion of the collect call;
a switch configured to (1) receive callback data from the automated service, (2) communicate an instruction to the caller to verbalize a name to generate the recorded name, (3) establish the collect call via a second communication link between the caller and the automated service where the collect call is completed from the automated service to the caller to enable the collect call, and (4) transfer the collect call to the database to generate the recording of the at least a portion of the collect call.

25. A collect callback system as recited in claim 24, wherein the switch is further configured to route the collect call via the second communication link though the switch.

26. A collect callback system as recited in claim 24, wherein the database is further configured to maintain associated recorded data that includes at least one of a caller identifier, a date of the collect call, a time of the collect call, a duration of the collect call, and caller touchtone inputs.

27. A collect callback system as recited in claim 24, wherein the switch is further configured to notify the automated service that the collect call for the caller is authorized such that the automated service can discontinue the communication link with the caller and such that the switch can establish the collect call via the second communication link.

28. A collect callback system as recited in claim 24, wherein the database is further configured to maintain caller data that corresponds to the caller, and wherein the switch is further configured to:
query a Line Information Database to verify that the caller can be billed for the collect call;
obtain the caller data from the database; and
authorize the collect call for the caller.

29. A collect callback system as recited in claim 24, wherein the database is further configured to maintain a service identifier and an associated access code that each correspond to the automated service, and wherein the switch is further configured to:
receive the callback data which includes the service identifier and a caller identifier;
obtain the access code associated with the service identifier from the database; and
utilize the caller identifier and the access code to establish the collect call via the second communication link between the caller and the automated service.

30. A collect callback system as recited in claim 24, wherein the database is further configured to:
maintain caller data that corresponds to the caller, the caller data including call limits for the caller;
maintain call limit standards that identify at least one of a day limit, a week limit, or a month limit; and
wherein the switch is further configured to obtain the caller data from the database and authorize the collect call for the caller if the call limits for the caller do not exceed the call limit standards.

31. A telecommunications system comprising the collect callback system as recited in claim 24.

32. A method for collect callback, comprising:
receiving callback data from a call-in service that receives a collect callback selection from a call source to which the call-in service has initiated a collect callback option via a communication link, the call-in service receiving authorization from the call source to initiate a collect call to the call source when the call source selects the collect callback option;
establishing communication with the call source after the communication link between the call source and the call-in service is discontinued;
communicating an instruction to the call source to verbalize a name;
recording the name of the call source;
establishing the collect call via a second communication link that is completed between the call source and the call-in service to enable the collect call; and
recording at least a portion of the collect call.

33. A method for collect callback as recited in claim 32, further comprising maintaining recorded data that includes at least one of the recording of the call source name, the recording of the portion of the collect call, a call source identifier, a date of the collect call, a time of the collect call, a duration of the collect call, and call source touchtone inputs.

34. A method for collect callback as recited in claim 32, further comprising notifying the call-in service that the collect call for the call source is authorized such that the call-in service can discontinue the communication link with the call source to enable establishing the collect call via the second communication link.

35. A method for collect callback as recited in claim 32, further comprising querying a Line Information Database to verify that the call source can be billed for the collect call.

36. A method for collect callback as recited in claim 32, wherein receiving the callback data includes receiving a call source identifier and a call-in service identifier that corresponds to an associated access code for the call-in service.

37. A method for collect callback as recited in claim 32, further comprising:
obtaining call limits for the call source; and
authorizing the collect call for the call source if the call limits for the call source do not exceed call limit standards that identify at least one of a day limit, a week limit, or a month limit.

38. A method for collect callback, comprising:
establishing a communication link with a call source that initiates communication with a call-in service;
initiating a collect callback option for the call source;
receiving a collect callback selection from the call source that authorizes receiving a collect call initiated by the call-in service;
communicating callback data to a switch that establishes the collect call via a communication link to the call source; and
receiving the collect call for the call source via the communication link that is routed though the switch, the collect call being completed from the call-in service to the call source to enable the collect call.

39. A method for collect callback as recited in claim 38, further comprising querying a Line Information Database to verify that the call source can be billed for the collect call.

40. A method for collect callback, comprising:
establishing a communication link between a caller and an automated service;
initiating a collect callback option for the caller as a form of payment for a duration of a collect call initiated by the automated service;
receiving an authorization input for the collect call from the caller;
maintaining an archive of recorded data associated with the collect call, the recorded data including a recorded name of the caller and a recording of at least a portion of the collect call;
communicating an instruction to the caller to verbalize a name to generate the recorded name;
establishing the collect call via a second communication link that is completed between the caller and the automated service to enable the collect call; and
recording the at least a portion of the collect call.

41. A method for collect callback as recited in claim 40, further comprising maintaining associated recorded data that includes at least one of a caller identifier, a date of the collect call, a lime of the collect call, a duration of the collect call, and caller touchtone inputs.

42. A method for collect callback as recited in claim 40, further comprising notifying the automated service that the collect call for the caller is authorized such that the automated service can discontinue the communication link with the caller and such that the collect call via the second communication link can be established.

43. A method for collect callback as recited in claim 40, further comprising querying a Line Information Database to verify that the caller can be billed for the collect call.

44. A method for collect callback as recited in claim 40, further comprising:
maintaining caller data that corresponds to the caller, the caller data including call limits for the caller;
maintaining call limit standards that identify at least one of a day limit, a week limit, or a month limit; and
authorizing the collect call for the caller if the call limits for the caller do not exceed the call limit standards.

45. One or more computer-readable media comprising computer executable instructions that, when executed, direct a telecommunications switch to:
receive callback data from a service that receives a collect callback selection from a caller via a communication link, the service receiving authorization from the caller to initiate a collect call to the caller when the caller selects the collect callback option;
establish communication with the caller after the communication link between the caller and the service is discontinued;
communicate an instruction to the caller to verbalize a name;
record the name of the caller;
establish the collect call via a second communication link that is completed between the caller and the service to enable the collect call; and
record at least a portion of the collect call.

46. One or more computer-readable media as recited in claim 45, further comprising computer executable instructions that, when executed, direct the telecommunications switch to notify the service that the collect call for the caller is authorized such that the service can discontinue the communication link with the caller and the telecommunications switch can establish the collect call via the second communication link.

47. One or more computer-readable media as recited in claim 45, further comprising computer executable instructions that, when executed, direct the telecommunications switch to query a Line Information Database to verify that the caller can be billed for the collect call.

48. One or more computer-readable media as recited in claim 45, further comprising computer executable instructions that, when executed, direct the telecommunications switch to:
obtain call limits for the caller; and
authorize the collect call for the caller if the call limits for the caller do not exceed call limit standards that identify at least one of a day limit, a week limit, or a month limit.

49. One or more computer-readable media comprising computer executable instructions that, when executed, direct a telecommunications service to:
establish a communication link with a caller that initiates communication with the telecommunications service;
initiate a collect callback option for the caller;
receive a collect callback selection from the caller to authorize receiving a collect call initiated by the telecommunications service;
communicate callback data to a switch that establishes the collect call via a communication link to the caller; and
receive the collect call for the caller via the communication link that is routed through the switch, the collect call being completed from the telecommunications service to the caller to enable the collect call.

50. One or more computer-readable media as recited in claim 49, further comprising computer executable instructions that, when executed, direct the telecommunications service to initiate a query of a Line Information Database to verify that the caller can be billed for the collect call.

51. A collect callback system, comprising an automated call-in device configured to:
establish a communication link with a call source that initiates communication with the automated call-in device;
initiate a collect callback option for the call source;
receive an authorization input for collect call payment from the call source for a collect call to be initiated by the automated call-in device; and
establish the collect call which is completed from the automated call-in device to the call source to enable the collect call.

52. A collect callback system as recited in claim 51, wherein the automated call-in device is further configured to query a Line Information Database to verify that the call source can be billed for the collect call.

53. A collect callback system as recited in claim 51, wherein the automated call-in device is an integrated component of a telecommunications switch.

54. A collect callback system as recited in claim 51, wherein the automated call-in device is farther configured to obtain call source data from a database and utilize the call source data to authorize the collect call for the call source.

55. A collect callback system as recited in claim 51, wherein the automated call-in device is farther configured to establish the collect call between the call source and a call-in service.

56. A collect callback system as recited in claim 51, wherein the automated call-in device is farther configured to communicate collect callback data to a telecommunications switch that establishes the collect call via a second communication link between the call source and a call-in service.

57. A collect callback system as recited in claim 51, wherein the automated call-in device is farther configured to record the authorization input for the collect call payment.

58. A collect callback system, comprising:
   an automated call-in device configured to initiate a collect callback option for a call source that initiates communication with the automated call-in device, the automated call-in device further configured to receive an authorization input for collect call payment from the call source for a collect call initiated by the automated call-in device; and
   a telecommunications switch configured to receive collect callback data from the automated call-in device and establish the collect call which is completed from the automated call-in device to the call source to enable the collect call.

59. A collect callback system as recited in claim 58, wherein the telecommunications switch is further configured to query a Line Information Database to verify that the call source can be billed for the collect call.

60. A collect callback system as recited in claim 58, wherein the automated call-in device is an integrated component of the telecommunications switch.

61. A collect callback system as recited in claim 58, wherein the automated call-in device is further configured to communicate the collect callback data to the telecommunications switch, the collect call back data including a call source identifier and a call-in device identifier.

62. A collect callback system as recited in claim 58, wherein the telecommunications switch is further configured to obtain call source data from a database and utilize the call source data to authorize the collect call for the call source.

63. A collect callback system as recited in claim 58, wherein the telecommunications switch is further configured to establish the collect call via a second communication link between the call source and a call-in service.

64. A collect callback system as recited in claim 58, wherein the telecommunications switch is further configured to record the authorization input for the collect call payment.

65. A method for collect callback, comprising:
   establishing a communication link with a call source that initiates communication with a call-in service;
   initiating a collect callback option for the call source;
   receiving an authorization input for collect call payment from the call source for a collect call initiated by the call-in service; and
   establishing the collect call which is completed from the call-in service to the call source to enable the collect call.

66. A method as recited in claim 65, further comprising querying a Line Information Database to verify that the call source can be billed for the collect call.

67. A method as recited in claim 65, further comprising communicating collect callback data to a telecommunications switch that establishes the collect call for the call source, the collect callback data including a call source identifier and a call-in device identifier.

68. A method as recited in claim 65, further comprising communicating collect callback data to a telecommunications switch that establishes the collect call via a second communication link between the call source and the call-in service.

69. A method as recited in claim 65, further comprising obtaining call source data from a database and utilizing the call source data to authorize the collect call for the call source.

70. A method as recited in claim 65, further comprising recording the authorization input for the collect call payment.

71. A method as recited in claim 65, wherein establishing the collect call includes establishing the collect call between the call source and the call-in service.

* * * * *